United States Patent [19]

Mine et al.

[11] Patent Number: 4,517,238

[45] Date of Patent: May 14, 1985

[54] METHOD OF MAKING INTEGRAL MOLDED SILICONE PRODUCTS WITH DIFFERENT PHASES AND THE MOLDED PRODUCTS PREPARED THEREFROM

[75] Inventors: Katsutoshi Mine; Toshio Suzuki; Tsuneo Hanada, all of Chiba, Japan

[73] Assignee: Toray Silicone Company, Ltd., Tokyo, Japan

[21] Appl. No.: 477,206

[22] Filed: Mar. 21, 1983

[30] Foreign Application Priority Data

Mar. 25, 1982 [JP] Japan ................................. 57-47644

[51] Int. Cl.$^3$ ........................... B05D 3/02; B32B 7/02
[52] U.S. Cl. .................................. 428/212; 427/302; 427/333; 427/342; 427/387; 428/420; 428/429; 428/447
[58] Field of Search ............... 428/447, 405, 429, 420, 428/212; 427/302, 333, 342, 387

[56] References Cited

U.S. PATENT DOCUMENTS

| | | | |
|---|---|---|---|
| 3,708,324 | 1/1973 | Stebleton | 117/47 R |
| 4,154,714 | 5/1979 | Hockemeyer | 428/447 |
| 4,163,082 | 7/1979 | Romenesko | 428/447 |
| 4,210,696 | 6/1980 | Ikeda | 428/420 |
| 4,245,079 | 1/1981 | Matsumoto | 428/429 |
| 4,337,332 | 6/1982 | Melancon | 428/447 |
| 4,347,346 | 8/1982 | Eckberg | 428/447 |
| 4,357,388 | 11/1982 | Minor | 428/447 |
| 4,360,566 | 11/1982 | Shimizu | 428/447 |
| 4,448,815 | 5/1984 | Grenoble | 427/387 |

*Primary Examiner*—Ellis P. Robinson
*Attorney, Agent, or Firm*—Roger H. Borrousch

[57] ABSTRACT

Integral silicone molded products comprising a unitary structure of a substrate with different phases is made by coating a substrate with a mixture of an alkenyl containing polyorganosiloxane, a polyorganohydrogensiloxane, and an addition-reaction catalyst where at least one component is applied to the substrate and then additional components are applied and diffuse to result in a coating with a polyorganosiloxane phase whose degree of crosslinking is low and a polyorganosiloxane phase whose degree of crosslinking is high and the phase having the low degree of crosslinking is next to the substrate. Such molded products are coated hybrid IC transistors, solar battery modules, and optical fibers.

14 Claims, No Drawings

METHOD OF MAKING INTEGRAL MOLDED SILICONE PRODUCTS WITH DIFFERENT PHASES AND THE MOLDED PRODUCTS PREPARED THEREFROM

BACKGROUND OF THE INVENTION

1. Field of the Invention

This invention relates to a method for the production of integral silicone molded products comprising a unitary structure of a substrate with a coating having different phases and the integral silicone molded products prepared therefrom. More specifically, this invention relates to a method for the production of integral silicone molded products characterized by coating a substrate with a polyorganosiloxane composition which is curable by the addition-reaction of alkenyl radicals with silicon-bonded hydrogen atoms and curing to produce a unitary structure having different phases.

2. Description of the Prior Art

In general, polyorganosiloxanes cured by the addition reaction of silicon-bonded lower alkenyl radicals to silicon-bonded hydrogen atoms exhibit excellent properties compared to organic resins. In particular, they possess excellent thermal resistance, cold resistance, and weather resistance and thus exhibit excellent long-term electrical properties such as stable electrical insulating properties and stable dielectric properties over a wide range of temperatures from low to high temperatures. They also exhibit excellent mechanical properties such as a stable strength, elongation, elasticity, and stress relaxation effect. It is also known that the above-mentioned excellent electrical and mechanical properties are little degraded by long-term ultraviolet irradiation. Moreover, silicone compositions are usually nonflammable or flame retarding. Furthermore, such silicone compositions may be converted relatively easily into a liquid, gel, elastomer, or hard resin without adversely affecting the essential properties of the silicone.

Silicones are used in many applications in various industries because they exhibit the above-mentioned excellent properties. For example, in the electrical industry, silicones are used for filling, impregnating, coating, and adhering electric and electronic parts because of their excellent insulating properties and nonflammability. Silicones are also widely used as a stress relaxing material or sealant for semiconductor elements, glasses, or polymers and as insulating protective materials for electric wire or cable because their mechanical and electrical properties are stable over a wide temperature range. In the machine industry, silicones are used as a vibration or impact absorber due to their excellent elasticity while in the building construction industry silicones are widely used as sealants, caulking materials, and paint.

Although silicone compositions exhibit the above-mentioned excellent properties, they exhibit the following disadvantages. For example, a liquid silicone which has been impregnated or filled as an insulating material will leak from the case or mix with dust due to its fluidity. A gel or elastomeric cured material may be used as a protective material for substrate with a low mechanical impact strength or thermal shock resistance based on its excellent adhesion, adhesiveness, resistance to moisture invasion, corrosion inhibition, and stress relaxing effect; however, the silicone may suffer from dust adhesion with resulting problems with the properties and external appearance. Moreover, the surface of a gel or elastomeric cured product does not possess sufficient mechanical strength, e.g., friction resistance and tear strength. On the other hand, compared with the above-mentioned liquid, gel, or elastomeric cured products, hard resinous cured products are superior in their suppression of fluid leaks and dust adhesion and have superior mechanical strength; however, they exhibit high hardness and a high modulus of elasticity with the result that they cannot satisfactorily exhibit stress relaxing effects for mechanical impact or thermal shock.

Methods for improving the above-mentioned defects in the silicone compositions have been used. Examples of these methods are as follows.

(A) A case or cover of inorganic or organic material is used for a liquid, gel, or elastomeric cured product in order to prevent fluid leaks or dust adhesion or for mechanical protection.

(B) A protective layer of another hard organic material is applied on the liquid, gel or elastomeric cured product in order to suppress dust adhesion or for mechanical protection.

(C) Romenesko in U.S. Pat. No. 4,163,082, issued July 31, 1979, describes coating a silicone gel or grease with a UV curable organopolysiloxane to reduce the surface tack and therefor reduce the dust adhesion. The UV curable coating composition is a mixture of an organopolysiloxane having an average of at least two olefinic radicals per molecule and a hydrogen-containing organopolysiloxane.

However, method (A) exhibits the disadvantages of increasing the number of processes, placing limitations on shape, and increasing the cost of starting materials. Method (B) exhibits the disadvantages of insufficient interlayer bonding strength resulting in the ready occurrence of interlayer peeling, increasing the number of processes, and increasing the cost of starting materials. Method (C) exhibits the disadvantages of ready occurrence of interlayer peeling as in method (B) and a complicated process control such as the control of film thickness. In particular, the film thickness is difficult to control when the final cured product is very thin such as several tens of $\mu$m.

SUMMARY OF THE INVENTION

Various methods were examined in order to produce an integral molded product in which a substrate is coated with an polyorganosiloxane composition which is curable by the addition reaction of silicon-bonded lower alkenyl radicals with silicon-bonded hydrogen atoms and in which the above-mentioned defects such as dust adhesion to the surface of the cured product, weak mechanical strength, and poor coating processability are improved. It was discovered that the above-mentioned purposes could be accomplished by an integral molded product in which a substrate is coated with a continuous addition-reaction curable polyorganosiloxane whose surface is a phase whose degree of crosslinking is relatively high for the suppression of dust adhesion and for mechanical protection and whose interior section is a phase whose degree of crosslinking is relatively low for stress relaxation.

This invention relates to the method for producing an integral silicone molded product comprising a unitary structure with different phases comprising coating a substrate with an addition-reaction curable polyorganosiloxane consisting essentially of (i) a polyorganosiloxane having at least two silicon-bonded alkenyl radicals per molecule where said alkenyl radicals have two to three carbon atoms per radical, (ii) a polyorganohydrogensiloxane having at least two silicon-bonded hydrogen atoms per molecule where the sum of the number of alkenyl radicals per molecule in component (i) and the number of silicon-bonded hydrogen atoms per molecule in component (ii) is at least 5, and (iii) an addition-reaction catalyst, where at least one of components (i), (ii), and (iii) is applied onto the substrate and a composition which necessarily contains the remainder of component (i), (ii), and (iii) but does not simultaneously contain all of components (i), (ii), and (iii) is then applied and diffuses with the result that the addition-reaction curable polyorganosiloxane composition coating is composed of a polyorganosiloxane phase whose degree of crosslinking is relatively low and a polyorganosiloxane phase whose degree of crosslinking is relatively high and the phase whose degree of crosslinking is relatively low is formed next to the substrate.

This invention also relates to an integral silicone molded product comprising a unitary structure with different phases comprising a substrate coated with an addition-reaction curable polyorganosiloxane composition consisting essentially of (i) a polyorganosiloxane having at least two silicon-bonded alkenyl radicals per molecule where said alkenyl radicals have two to three carbon atoms per radical, (ii) a polyorganohydrogensiloxane having at least two silicon-bonded hydrogen atoms per molecule where the sum of the number of alkenyl radicals per molecule in component (i) and the number of silicon-bonded atoms per molecule in component (ii) is at least 5, and (iii) an addition-reaction catalyst, where the addition-reaction curable organopolysiloxane composition coating is composed of a polyorganosiloxane phase whose degree of crosslinking is relatively low and a polyorganosiloxane phase whose degree of crosslinking is relatively high and the phase whose degree of crosslinking is relatively low is next to the substrate.

DETAILED DESCRIPTION OF THE INVENTION

The polyorganosiloxane, component (i), possesses at least two silicon-bonded lower alkenyl radicals per molecule and can be expressed by the average unit formula $$R_a SiO_{(4-a)/2}$$

where each R is a monovalent radical selected from hydrocarbon radicals, halogenated hydrocarbon radicals, and cyanoalkyl radicals and a can have a value from 1 to 3 inclusive. At least two of the R in each molecule are lower alkenyl where lower alkenyl is understood to mean alkenyl radicals having two or three carbon atoms per radical. The lower alkenyl radicals include vinyl, allyl, 1-propenyl, and isopropenyl. Vinyl is preferred. At least 2 lower alkenyl radicals are present per molecule of polyorganosiloxane and they may be located at any position; however at least 2 such radicals preferably are as far apart as possible. The monovalent hydrocarbon radicals include methyl, ethyl, n-propyl, octyl, cyclohexyl, phenyl, tolyl, xylyl, and benzyl. The halogenated monovalent hydrocarbon radicals can be 3,3,3-trifluoropropyl and chlorophenyl. An example of cyanoalkyl is cyanoethyl. More than half of the R radicals which are not lower alkenyl are preferably methyl. The polyorganosiloxane (i) can contain silicon-bonded hydroxyl radicals and can be linear, branched, cyclic, or network. Polyorganosiloxane (i) can be a homopolymer or a copolymer or a mixture of polymers and its degree of polymerization can range from an oligomer to a high polymer of 1,000 to 100,000 repeating units.

The polyorganohydrogensiloxane, component (ii), possesses at least two silicon-bonded hydrogen atoms per molecule and can be expressed by the average unit formula $$R'_b SiO_{(4-b)/2}$$

where each R' is a hydrogen atom or a monovalent radical selected from hydrocarbon radicals, halogenated hydrocarbon radicals, and cyanoalkyl radicals and b can have a value from 1 to 3 inclusive. At least two of the R' in each molecule are silicon-bonded hydrogen atoms.

The monovalent hydrocarbon radicals can include methyl, ethyl, n-propyl, octyl, cyclohexyl, phenyl, tolyl, xylyl, and benzyl. The halogenated monovalent hydrocarbon radicals can include 3,3,3-trifluoropropyl and chlorophenyl. An example of cyanoalkyl is cyanoethyl. More than half of the R' radicals which are not hydrogen are preferably methyl. The sum of the number of silicon-bonded lower alkenyl radicals per molecule in component (i) and the number of silicon-bonded hydrogen atoms per molecule in component (ii) should be at least 5 in order for the composition of this invention to be a gel, an elastomer, or a hard resin after curing. The composition of this invention is preferably mixed under the condition of 0.2 to 2.0 moles of silicon-bonded hydrogen atoms per one mole of silicon-bonded lower alkenyl radical. The polyorganohydrogensiloxane can be linear, branched, cyclic, or network structure. Component (ii) can be a homopolymer or copolymer and its degree of polymerization can range from a dimer to a high polymer of 500 to 2,000 repeating units.

The addition-reaction catalyst, component (iii), is any catalyst which is useful for the addition reaction of silicon-bonded lower alkenyl radicals with silicon-bonded hydrogen atoms. Examples of the addition-reaction catalyst are finely divided elemental platinum, finely divided platinum which has been dispersed on carbon powder, platinum chloride, a chloroplatinic acid-olefin complex, chloroplatinic acid-vinylsiloxane complex, tetrakis(triphenylphosphine)palladium, a mixture or palladium black and triphenylphosphine, and rhodium catalysts. The quantity of the addition-reaction catalyst, component (iii), affects the rate of curing and is arbitrary; however, in industrial practice it is usually in the range from 0.1 to 20 parts by weight metal per 1 million parts by weight of the combined quantity of components (i) and (ii).

The object molded product of this invention can be produced by the method described below from an appropriate mixture of the three components mentioned above and additional components, if necessary, which will be discussed later. The mixing ratio of the above-mentioned three components depends on the configuration of the object molded product, desired electrical and mechanical properties, and methods for applying each component mentioned above; however, the mixing ratio of the three components in the system before curing should satisfy the component ratios specified above.

Components to be added as necessary, in addition to the above-mentioned three components, include fillers such as fumed silica, precipitated silica, hydrophobicized fumed silica, hydrophobic precipitated silica, quartz fine powder, diatomaceous earth, talc, aluminum silicate, zirconium silicate, alumina, calcium carbonate, zinc oxide, titanium dioxide, ferric oxide, glass fiber, asbestos, and glass beads; organic solvents such as xylene, toluene, and trichloroethylene; addition-reaction retardants such as benzotriazole, 2-ethynylisopropanol, and dimethylsulfoxide; flame retardants such as manganese carbonate, carbon black, and fumed titanium oxide; thermal stabilizers; oil resistance agents; and colorants such as dyes and pigments. Additional components such as polyorganosiloxanes and organosilanes which increase the adhesiveness can optionally be added.

The integral silicone molded product comprising a unitary structure with different phases which is produced by the method of this invention can be produced by the following procedures. A substrate is coated with component (i) or (ii) onto which a mixture of component (iii) and remaining component (i) or (ii) is subsequently applied and diffused. A substrate is coated with two of components (i), (ii), and (iii) onto which one of components (i), (ii), and (iii) is subsequently applied and diffused. A substrate is coated with all three of components (i), (ii), and (iii) onto which one of components (i), (ii), and (iii) is subsequently applied and diffused. Such production methods can form a unitary structure comprising an polyorganosiloxane phase with a relatively low degree of crosslinking and an polyorganosiloxane phase with a relatively high degree of crosslinking in which the phase with the relatively low degree of crosslinking is next to the substrate.

The method of diffusion-coating a substrate includes immersion in the component solution, brush or sponge painting, spraying, component evaporation, and injection using a syringe, any of which can produce the desired product. The component which is applied and diffused onto the surface of the already-formed layer is preferably a compound with a relatively low molecular weight and the coating layer itself should not be unnecessarily thick. The appropriate molecular weight of the applied and diffusing component depends on the degree of crosslinking of the already-formed layer, affinity of the already-formed layer for the applied and diffusing component, and the diffusion-curing conditions. In any case, the applied and diffusing component should form a layer with an appropriated thickness with the already-formed layer after diffusing and curing. It should not remain in an uncured state.

The cured state of the silicone in the integral silicone molded product comprising a unitary structure with different phases which has been produced by the above-mentioned method will be discussed in the following. A liquid silicone, including that with essentially a three-dimensional network structure, is a polysiloxane which is essentially fluid, usually $\geq 0.1$ Pa·s, preferably $\geq 1$ Pa·s. A silicone gel is a molded product which possesses a partial three-dimensional network structure, which undergoes deformation, which exhibits a limited fluidity under the application of stress and which is roughly defined by a hardness of "0" or less as measured by a JIS rubber hardness meter. An elastomeric silicone is a molded product which possesses essentially a three-dimensional network structure and which is roughly defined by the hardness range of "greater than 0 to 100" as measured by a JIS rubber hardness meter. A very hard silicone resin is a molded product which possesses essentially a three-dimensional network structure and which is roughly defined by a hardness of "$\geq 100$" as measured by a JIS rubber hardness meter.

The integral silicone molded product comprising a unitary structure with different phase which is described in this invention is a combination of the above-mentioned cured silicone states. The different phases of the unitary structure of the integral silicone molded product are determined by relative comparison. The side next to the substrate is the phase whose degree of crosslinking is relatively low. Combinations include a large number of varieties such as, for example, gel-liquid silicone molded product, elastomeric-liquid silicone molded product, elastomeric-gel silicone molded product, very hard resin-gel silicone molded product, very hard resin-elastomeric silicone molded product, elastomeric-gel-liquid molded product, and very hard resin-elastomeric-gel molded product. The cured state of the integral silicone molded product is not limited to the above-mentioned examples.

According to the method of this invention, a substrate which exhibits a low mechanical impact resistance or thermal shock resistance can be coated with an integral molded product composed of a very hard, very strong, and nontacky surface phase whose degree of crosslinking is relatively high and a relatively soft, tacky, and stress-relaxing whose degree crosslinking is relatively low. For this reason, a traditional two-layer coating comprising a mechanically protective layer and a stress-relaxing layer of different materials is not needed. As a result, a traditional two-layer coating or case is not required in the following examples. This invention is applicable as a filling, impregnating, and coating material for electric and electronic parts, such as high voltage circuits such as flyback transformers, igniters, and regulators; as a surface protecting material for semiconductor elements, bonding wire, and solar batteries; as an insulating protective material for electric wire and cable; as a protective material for optical fibers and as a protective material for personal ornaments.

This invention will be explained using demonstrational examples which are used only by way of explanation. The invention is not limited to the examples.

"Part" and "%" in the examples denote "part by weight" and "% by weight," respectively. The viscosity was measured at 25° C. unless otherwise specified. "Me" in the chemical formulas represents "methyl," "Vi" represents "vinyl" and "Ph" represents "phenyl."

EXAMPLE 1

A dimethylvinylsiloxy terminated polydimethylsiloxane (99.5 parts, viscosity 2 Pa·s) is combined with a trimethylsiloxy terminated polymethylhydrogensiloxane (abbreviated to MHP, 0.5 parts, viscosity 0.01 Pa·s), ethynylhexanol (0.05 parts) as a curing retarder, and an ethanol solution of chloroplatinic acid (10 ppm platinum based on the combined quantity of the above-mentioned siloxanes). The resulting mixture is thoroughly mixed and filled 5 mm deep into an igniter case (PET) which is subsequently placed in an oven and cured at 120° C. for 30 minutes. The surface of the cured product was a gel. The cured product was cooled to room temperature and then coated with MHP (0.1 g per 5 cm² of surface of the cured product) using an impregnated sponge. It was allowed to stand in an oven at 80° C. for 20 minutes and then cooled to room temperature.

The surface of the cured product was tacky and gel-like in the absence of the MHP treatment while the surface of the MPH-treated product was nontacky. For this reason, the MHP treated product was easily handled in the assembly process.

EXAMPLE 2

An polyorganosiloxane (97 parts, viscosity 10 Pa·s, MeViSiO units 20 mol %, the remainder are PhSiO$_{3/2}$, MeSiO$_{3/2}$, Me$_2$SiO, and Me$_3$SiO$_{1/2}$ units) was combined with a trimethylsiloxy terminated polymethylhydrogensiloxane (abbreviated MHP', 3 parts, viscosity 0.02 Pa·s), ethynylhexanol (0.05 parts) as a curing retarder, and an ethanol solution of chloroplatinic acid (15 ppm platinum based on the combined quantity of the above-mentioned siloxanes). The resulting mixture was thoroughly mixed and coated on a hybrid IC transistor which was subsequently cured in an oven at 150° C. for 30 minutes. The cured material was removed from the oven and cooled to room temperature. The surface of the cured product was a gel. MHP' (0.5 g per 5 cm$^2$ of surface of the gel cured product) was coated dropwise using a syringe. The cured product was then heated in an oven at 150° C. for 10 minutes. It was removed from the oven and cooled to room temperature. The surface of the cured product was elastomeric. Both the MHP'-treated hydrid IC and MHP'-untreated hydrid IC were examined by environmental testing. The results showed that the MHP'-untreated hydrid IC exhibited an increase in surface leakage current because a large amount of hygroscopic foreign material was adhered on the transistor's surface. On the other hand, the MHP'-treated hydrid IC did not exhibit any increase in leakage current because the quantity of adhered hydroscopic foreign material was small.

EXAMPLE 3

An polyorganosiloxane (95 parts, viscosity 6 Pa·s, 35 mol % MeViSiO units and remainder PhSiO$_{3/2}$, MeSiO$_{3/2}$, Me$_2$SiO, and Me$_3$SiO$_{1/2}$ units) was combined with a trimethylsiloxy terminated polymethylhydrogensiloxane (abbreviated as MHP, 5 parts, viscosity 0.01 Pa·s), ethynylhexanol (0.05 parts) as a curing retarder, and an ethanol solution of chloroplatinic acid (10 ppm platinum based on the combined quantity of the above-mentioned siloxanes). The resulting mixture was poured and filled to an 8 mm depth in a solar battery module in an aluminum case which was subsequently placed in an oven at 100° C. for 30 minutes to cure the mixture. The cured product was removed from the oven and cooled to room temperature. The cured product was elastomeric. MHP (0.01 Pa·s, 0.8 g per 5 cm$^2$ surface of the cured product) was coated on the surface of the cured product using a sprayer followed by heating at 100° C. for 10 minutes. It was removed from the oven and cooled to room temperature. The surface of the cured product was a hard resin. Both the MHP-treated solar battery module and the untreated solar battery module were exposure tested outdoors for 1000 hours. The results showed that the MHP-untreated module exhibited a 50% decline from the initial light transmittance due to dust adhesion while the MHP-treated module maintained 80% of the initial light transmittance due to the fact that the quantity of adhered dust was small.

EXAMPLE 4

A dimethylvinylsiloxy terminated polydimethylsiloxane (50 parts, viscosity 1 Pa·s) was combined with a trimethylsiloxy terminated methylhydrogen-dimethyl copolysiloxane (50 parts, viscosity 0.5 Pa·s), and ethynylhexanol (0.01 parts) as a curing retarder, and then with an ethanol solution of chloroplatinic acid (10 ppm platinum based on the combined quantity of the above-mentioned siloxanes). The resulting mixture was thoroughly mixed and coated to a 0.5 mm thickness on a poly(methylmethacrylate) optical fiber using a die and then cured in a 3 m oven at 80° C.

The cured product was a gel. Its surface was coated with 1,3,5,7-tetravinyl-1,3,5,7-tetramethylcyclotetrasiloxane (0.005 Pa·s, 0.2 g per 5 cm$^2$ of surface of the cured product) using a sponge impregnated with this siloxane. It was continuously passed through a 3 m curing oven heated to 80° C. The surface of the cured product was elastomeric. When the coated/treated fiber was taken up on a fiber drum, it did not suffer from sticking or rupture of the coated layer. The coat was well adhered to the fiber. On the other hand, the coated/untreated fiber essentially could not be taken up on a fiber drum because of sticking of the fibers to each other and coat peeling.

That which is claimed is:

1. A method for producing an integral silicone molded product comprising a unitary structure with different phases comprising coating a substrate with an addition-reaction curable polyorganosiloxane consisting essentially of
   (i) a polyorganosiloxane having at least two silicon-bonded alkenyl radicals per molecule where said alkenyl radicals have two to three carbon atoms per radical,
   (ii) a polyorganohydrogensiloxane having at least two silicon-bonded hydrogen atoms per molecule where the sum of the number of alkenyl radicals per molecule in component (i) and the number of silicon-bonded hydrogen atoms per molecule in component (ii) is at least 5, and
   (iii) an addition-reaction catalyst,
where at least one of components (i), (ii), and (iii) is applied onto the substrate and a composition which necessarily contains the remainder of component (i), (ii), and (iii) but does not simultaneously contain all of components (i), (ii), and (iii) is then applied and diffuses with the result that the addition-reaction curable polyorganosiloxane composition coating is composed of a polyorganosiloxane phase whose degree of crosslinking is relatively low and a polyorganosiloxane phase whose degree of crosslinking is relatively high and the phase whose degree of crosslinking is relatively low is formed next to the substrate.

2. The method in accordance with claim 1 in which the substrate is coated with components (i) or (ii) and then with a mixture of component (iii) with remaining component (i) or component (ii).

3. The method in accordance with claim 1 in which the substrate is coated with a composition containing two of components (i), (ii), and (iii) and then with the individual remaining component.

4. The method in accordance with claim 1 in which the substrate is coated with a composition of all of components (i), (ii), and (iii) and then with one of components (i), (ii), and (iii).

5. The method in accordance with claim 4 in which the substrate is coated with a composition of components (i), (ii), and (iii) which is cured by heating, then coated with (ii), and thereafter subjected to further heating.

6. The method in accordance with claim 5 in which the composition is a mixture of dimethylvinylsiloxy terminated polydimethylsiloxane, trimethylsiloxy terminated polymethylhydrogensiloxane, a platinum catalyst, and a platinum catalyst addition-reaction retardant, the composition after being coated on the substrate is heated thereby curing the composition, and then the resulting cured composition is coated with trimethylsiloxy terminated polymethylhydrogensiloxane and then heated again.

7. The method in accordance with claim 5 in which the composition is a mixture of polyorganosiloxane having units of methylvinylsiloxane, phenylsilsesquioxane, methylsilsesquioxane, dimethylsiloxane, and trimethylsiloxy, trimethylsiloxy terminated polymethylhydrogensiloxane, a platinum catalyst, and a platinum catalyst addition-reaction retardant, the composition after being coated on the substrate is heated thereby curing the composition, and then the resulting cured composition is coated with trimethylsiloxy terminated polymethylhydrogensiloxane and then heated again.

8. The method in accordance with claim 5 in which the composition is a mixture of dimethylvinylsiloxy terminated polydimethylsiloxane, trimethylsiloxy terminated polymethyldrogensiloxane, a platinum catalyst, and a platinum catalyst addition-reaction retardant, the composition after being coated on the substrate is heated thereby curing the composition, and then the resulting cured composition is coated with 1,3,5,7-tetravinyl-1,3,5,7-tetramethylcyclotetrasiloxane, and then heated again.

9. A product obtained by the method of claim 1.

10. A product obtained by the method of claim 1 in which the phase whose degree of crosslinking is relatively low is a liquid and the phase whose degree of crosslinking is relatively high is a gel.

11. A product obtained by the method of claim 1 in which the phase whose degree of crosslinking is relatively low is a liquid and the phase whose degree of crosslinking is relatively high is an elastomer.

12. A product obtained by the method of claim 1 in which the phase whose degree of crosslinking is relatively low is a gel and the phase whose degree of crosslinking is relatively high is an elastomer.

13. A product obtained by the method of claim 1 in which the phase whose degree of crosslinking is relatively low is a gel and the phase whose degree of crosslinking is relatively high is a resin.

14. A product obtained by the method of claim 1 in which the phase whose degree of crosslinking is relatively low is an elastomer and the phase whose degree of crosslinking is relatively high is a resin.

* * * * *

UNITED STATES PATENT AND TRADEMARK OFFICE
CERTIFICATE OF CORRECTION

PATENT NO. : 4,517,238
DATED : May 14, 1985
INVENTOR(S) : Katsutoshi Mine and Toshio Suzuki and Tsuneo Hanada It is certified that error appears in the above-identified patent and that said Letters Patent is hereby corrected as shown below:

In Column 5, line 28, the word "an" should read "a"

In Column 5, line 29, the word "an" should read "a"

In Column 5, line 56, the symbol "$>$" should read "$\geq$"

In Column 6, line 1, the symbol "$>$" should read "$\geq$" (2 times)

In Column 6, line 68, the word "MPH-treated" should read "MHP-treated"

In Column 7, line 5, the word "An" should read -- A --.

In Column 7, line 35, the word "An" should read -- A --.

In Column 8, line 22, the word "molded" should be deleted

Signed and Sealed this

Fourth Day of March 1986

[SEAL]

Attest:

DONALD J. QUIGG

Attesting Officer

Commissioner of Patents and Trademarks